Patented Mar. 8, 1949

2,463,942

UNITED STATES PATENT OFFICE 2,463,942

N-PHENYLACETYLATED AMINO ALCOHOLS AND ETHERS

Otto K. Behrens, Reuben G. Jones, and Joseph W. Corse, Indianapolis, Ind., assignors to Eli Lilly and Company, Indianapolis, Ind., a corporation of Indiana No Drawing. Application August 24, 1945, Serial No. 612,536

4 Claims. (Cl. 260—558)

This invention relates to new organic chemical compounds and is directed to certain new N-phenylacetylated amino alcohols and derivatives thereof.

By this invention there are provided new phenylacetyl compounds represented by the following general formula

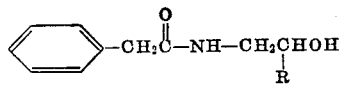

wherein R represents a member of the class consisting of hydrogen methyl and ethyl; and lower alkyl ether, lower aliphatic carboxy acyl and phenylacetyl derivatives thereof.

By way of illustration, when R represents hydrogen the compound is N-(2-hydroxyethyl)-phenylacetamide. When R represents methyl, the compound is N-(2-hydroxypropyl)-phenylacetamide.

This invention also comprehends within its scope lower alkyl ethers such as the methyl, ethyl, propyl and isopropyl ethers as well as the lower alkyl —COOH and phenylacetyl esters such as the acetyl, propionyl, butyryl and the phenylacetyl esters of the compounds represented by the general formula above. Illustratively, the methyl ether of a compound as shown above may be represented by the formula

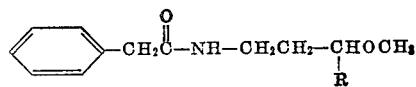

wherein R has the same significance as before. Thus for example, when R in the above formula represents hydrogen the compound is N-(2-methoxyethyl)-phenylacetamide and may be represented by the following formula

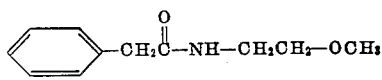

Further by way of illustration, a phenylacetyl ester of the compounds represented by the general formula above may be represented by the following formula

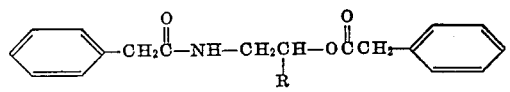

wherein R has the same significance as before. Thus for example, when R represents hydrogen the compound is N-(2-phenylacetoxyethyl)-phenylacetamide and may be represented by the formula

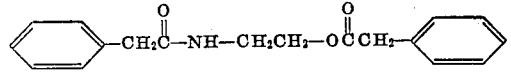

The compositions of the present invention may be prepared by a process of phenylacetylation. Thus an alkanolamine, or an alkyl ether or acyloxy derivative thereof, for example ethanolamine or its methyl ether or its phenylacetyl ester, may be heated with phenylacetic acid or with an ester of phenylacetic acid such as ethyl phenylacetate, to produce the desired N-(2-hydroxyethyl)-phenylacetamide, or methyl ether or phenylacetyl ester thereof, as the case may be. Alternatively, the alkanolamine or its ether or acyl ester may be reacted with a phenylacetyl halide, for example phenylacetyl chloride, to produce the desired phenylacetyl compound.

As described and claimed in copending application Serial No. 612,538, filed on even date herewith (now Patent No. 2,440,359), the compounds of this invention have been found to exhibit novel and unexpected utility in the preparation of penicillin. By way of contrast, this utility is not possessed by phenylacetylated alkanolamines in general. It is known of course that penicillin may be produced, presumably as a metabolic product, when a Penicillium mold is grown in the presence of a nutrient medium, and the penicillin so produced subsequently may be isolated from the mold and nutrient medium.

As described and claimed in said Patent No. 2,440,359, an accelerated rate of production and increased yield of penicillin may be obtained by incorporating a relatively small amount of one or more of the compounds of the present invention in the culture medium of a nutrient material in which the Penicillium mold is grown.

Illustratively, in the submerged culture process of producing penicillin by employing for example, N-(2-hydroxyethyl)-phenylacetamide in the culture medium, the concentration of penicillin produced in certain tests under comparative conditions has been substantially increased.

This invention is further illustrated by the following specific examples.

Example 1

N-(2-hydroxyethyl)-phenylacetamide represented by the formula

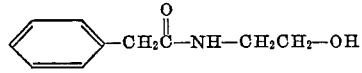

may be prepared as follows:

A mixture of 328 g. of ethyl phenylacetate and 132 g. of ethanolamine is heated at 150° C. until no more ethyl alcohol distills from the reaction mixture. The time required for this heating is about two hours, and during the heating about 115 cc. of ethyl alcohol distills from the reaction mixture. The excess ethanolamine remaining in the reaction mixture is substantially completely removed by subjecting the reaction mixture to a vacuum, preferably below 20 mm. pressure, while maintaining the reaction mixture at a temperature of about 140–150° C. The residue comprising crude N-(2-hydroxyethyl)-phenylacetamide is purified by dissolving it in ethyl alcohol and precipitating it from solution by the addition of ether. Purified N-(2-hydroxyethyl)-phenylacetamide has been found to melt at about 61–62° C., and analysis has shown the presence of 7.70 percent nitrogen as compared with a calculated value of 7.82 percent.

*Example 2*

N-(2-methoxyethyl)-phenylacetamide represented by the formula

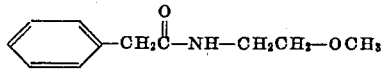

may be prepared as follows:

20.8 g. of a 72 percent solution of 2-methoxyethylamine in water are cooled to about 0° C., stirred vigorously, and 17 g. of phenylacetyl chloride added thereto over a period of about one half hour. The reaction mixture is extracted with ether whereby the N-(2-methoxyethyl)-phenylacetamide is obtained in solution. The ether solution is washed with dilute hydrochloric acid, dilute sodium hydroxide solution and water and dried with anhydrous sodium sulfate. Upon evaporation of the ether under reduced pressure, the N-(2-methoxyethyl)-phenylacetamide is obtained in substantially pure form as a clear colorless liquid. Analysis has shown the presence of 6.93 per cent nitrogen as compared with a calculated value of 7.25 percent.

*Example 3*

N-(2-hydroxybutyl)-phenylacetamide represented by the formula

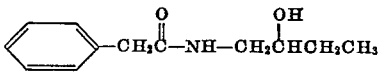

may be prepared as follows:

16.4 g. of ethyl phenylacetate and 8.9 g. of 2-hydroxybutylamine are heated at about 125° C. for 15 hours. The reaction mixture is then cooled and dissolved in about 50 cc. of absolute alcohol. Upon the addition of about 2 volumes of ether to the solution, N-(2-hydroxybutyl)-phenylacetamide is obtained as an oil which slowly crystallizes upon standing. The compound is purified by redissolving the crystalline material in alcohol and reprecipitating with ether. The product thus obtained melts at about 57–59° C. Analysis has shown the presence of 6.8 percent nitrogen as compared with a calculated value of 6.75 percent.

*Example 4*

N-(2-hydroxypropyl)-phenylacetamide represented by the formula

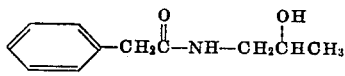

may be prepared in the same manner as the N-(2-hydroxybutyl)-phenylacetamide described in Example 3 was prepared. N-(2-hydrovypropyl)-phenylacetamide has been found to melt at 80–81° C. and analysis has shown the presence of 7.20 percent nitrogen as compared with a calculated value of 7.25 percent.

*Example 5*

N-(2-phenylacetoxyethyl)-phenylacetamide represented by the formula

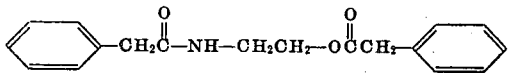

may be prepared as follows:

6.1 g. of ethanolamine and 29.9 g. of phenylacetic acid are heated at about 160–180° C. for about five hours. The molten reaction product is then cooled and extracted with potassium bicarbonate solution. The insoluble residue consisting of N-(2-phenylacetoxyethyl)-phenylacetamide is purified by precipitating it from alcohol solution by the addition of several volumes of water. The purified product melts at about 85° C. and analysis has shown the presence of 4.6 per cent nitrogen as compared with a calculated value of 4.72 percent.

What is claimed is:

1. N-(2-hydroxypropyl)-phenylacetamide represented by the formula

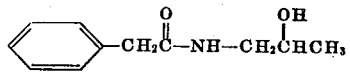

2. N-(2-hydroxybutyl)-phenylacetamide represented by the formula

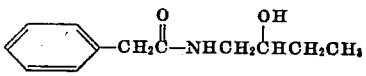

3. N-(2-hydroxyethyl)-phenylacetamide represented by the formula

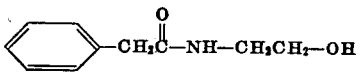

4. A member of the group consisting of N-(2-hydroxyethyl)-phenylacetamide, N-(2-hydroxypropyl)-phenylacetamide and N-(2-hydroxybutyl)-phenylacetamide, and the lower alkyl ethers thereof.

OTTO K. BEHRENS.
REUBEN G. JONES.
JOSEPH W. CORSE.

REFERENCES CITED

The following references are of record in the file of this patent:

UNITED STATES PATENTS

| Number | Name | Date |
|---|---|---|
| 1,990,453 | Hund et al. | Feb. 5, 1935 |
| 2,111,820 | Steindorff et al. | Mar. 22, 1938 |
| 2,338,177 | Graenacher et al. | Jan. 4, 1944 |
| 2,355,141 | Boese | Aug. 8, 1944 |

FOREIGN PATENTS

| Number | Country | Date |
|---|---|---|
| 438,659 | Great Britain | Nov. 15, 1935 |

OTHER REFERENCES

Pictet et al., "Berichte der Deutschen Chemischen Gesellschaft," vol. 43 (1910), page 2386.

Franket et al., "Berichte der Deutschen Chemischen Gesellschaft," vol. 51 (1918), page 1657.

Thomas et al., "Chemical Abstracts," vol. 19 (1925), page 635. Abstract of "Zeitsch. physiol. Chem.," vol. 140 (1924), pages 244–260.

Bettzieche, "Chemical Abstracts," vol. 19 (1925), page 3254. Abstract of "Zeitsch. physiol. Chem.," vol. 146 (1925), pages 227–240.